United States Patent
Keller

(10) Patent No.: US 8,079,443 B2
(45) Date of Patent: Dec. 20, 2011

(54) AIRCRAFT TRIM PANEL WITH INTEGRATED ADJUSTABLE ACOUSTIC PROPERTIES

(75) Inventor: Hans-Peter Keller, Suhr (CH)

(73) Assignee: Pelzer Acoustic Products GmbH, Wuppertal (DE)

( * ) Notice: Subject to any disclaimer, the term of this patent is extended or adjusted under 35 U.S.C. 154(b) by 0 days.

(21) Appl. No.: 11/969,949

(22) Filed: Jan. 7, 2008

(65) Prior Publication Data

US 2009/0173571 A1  Jul. 9, 2009

(51) Int. Cl.
*G10K 11/168* (2006.01)
*G10K 11/172* (2006.01)

(52) U.S. Cl. ..................... 181/292

(58) Field of Classification Search .......... 181/286, 181/290, 292, 294; 244/1 N; 415/119
See application file for complete search history.

(56) References Cited

U.S. PATENT DOCUMENTS

| | | | | |
|---|---|---|---|---|
| 3,822,762 A * | 7/1974 | Crispin et al. | ............ | 181/292 |
| 4,294,329 A * | 10/1981 | Rose et al. | ............ | 181/222 |
| 5,414,232 A * | 5/1995 | Wilson | ............ | 181/292 |
| 5,604,010 A * | 2/1997 | Hartz et al. | ............ | 428/118 |
| 5,611,504 A | 3/1997 | Haynes et al. | | |
| 5,997,985 A * | 12/1999 | Clarke et al. | ............ | 428/116 |
| 6,033,770 A * | 3/2000 | Matsuki et al. | ............ | 428/309.9 |
| 6,065,717 A * | 5/2000 | Boock | ............ | 244/1 N |
| 6,158,690 A | 12/2000 | Wadey et al. | | |
| 6,179,086 B1 * | 1/2001 | Bansemir et al. | ............ | 181/292 |
| 6,220,388 B1 * | 4/2001 | Sanborn | ............ | 181/290 |
| 6,267,838 B1 | 7/2001 | Saugnac et al. | | |
| 6,371,242 B1 * | 4/2002 | Wilson et al. | ............ | 181/292 |
| 6,772,857 B2 | 8/2004 | Porte et al. | | |
| 6,966,594 B2 | 11/2005 | Wojewnik | | |
| 7,040,575 B2 | 5/2006 | Struve et al. | | |
| 7,246,772 B2 | 7/2007 | Drost et al. | | |
| 2006/0145004 A1 * | 7/2006 | Drost et al. | ............ | 244/118.5 |
| 2006/0145005 A1 | 7/2006 | Drost | | |
| 2006/0145006 A1 | 7/2006 | Drost | | |
| 2006/0177620 A1 * | 8/2006 | Gray et al. | ............ | 428/57 |
| 2007/0102239 A1 * | 5/2007 | Liguore et al. | ............ | 181/292 |
| 2008/0099609 A1 | 5/2008 | Drost | | |

FOREIGN PATENT DOCUMENTS

WO  2007137067 A1  6/2007

* cited by examiner

*Primary Examiner* — Jeremy Luks
(74) *Attorney, Agent, or Firm* — Bryan W. Bockhop; Bockhop & Associates, LLC

(57) ABSTRACT

A trim panel for an aircraft interior includes a first sound attenuating layer, a structural layer and a second sound attenuating layer. The structural layer is coupled to the exterior sound attenuating layer, and has an exterior side and an opposite interior side. The structural layer defines a plurality of passages that open to both the exterior side and the interior side so as to minimize radiation of noise due to a hydrodynamic shortcut created by each of the passages across the structural layer. The second sound attenuating layer is coupled to the structural layer and has a high sound absorption characteristic. The second sound attenuating layer is configured to be disposed adjacent to the aircraft interior.

7 Claims, 2 Drawing Sheets

AIRCRAFT TRIM PANEL WITH INTEGRATED ADJUSTABLE ACOUSTIC PROPERTIES

BACKGROUND OF THE INVENTION

1. Field of the Invention

The present invention relates to interior trim panels for aircraft and, more specifically, to an acoustic absorption trim panel that reduces aircraft interior noise levels.

2. Description of the Prior Art

Acoustical considerations in aircraft design are becoming increasingly important for high-end private aircraft and helicopters. Cabin noise in aircraft can lead to substantial discomfort among passengers and can interfere with aircraft operations. External noise typically comes from the engines, moving parts associated with aircraft components and airflow over the airframe.

Most aircraft are built about a structural framework. An outer skin is applied to the framework and thermal insulation is placed between the skin and the cabin interior. A trim panel, which often has a decorative interior surface, is used to cover the insulation and the framework.

Existing trim panels are typically constructed of a thin layer of a rigid material that has an impact resistance that meets the manufacturer's standards. One side of the rigid material layer may include an aesthetic surface and a layer of sound absorptive material may be applied to the other side. The panel is then attached to the structural framework with anti-vibration mounts. However, such trim panels tend to transmit sound in a manner analogous to that of an audio loudspeaker. Essentially, a local source of noise will cause the entire panel to vibrate, thereby radiating sound into the aircraft cabin.

Several different trim panels have been designed in attempt to reduce noise radiation from outside the aircraft. One type of panel includes a honeycomb core layer made of a rigid material to provide the necessary structural strength and a layer of a damping foam material outside of the honeycomb core layer. An aesthetic décor layer material is placed on the cabin side of the honeycomb core. However, because the honeycomb layer is impervious to air, any air pressure fluctuations (corresponding to noise) that impact the honeycomb layer will radiate across the entire honeycomb layer. Thus, although the foam layer will dampen the noise somewhat, the honeycomb layer will act like an audio loudspeaker that radiates noise throughout the inside of the cabin.

Therefore, there is a need for a rigid, lightweight, acoustic absorption trim panel that both dampens exterior noise and transmits local exterior air pressure fluctuations so as not to radiate noise.

SUMMARY OF THE INVENTION

The disadvantages of the prior art are overcome by the present invention which, in one aspect, is a trim panel for an aircraft interior that includes a first sound attenuating layer, a structural layer and a second sound attenuating layer. The structural layer is coupled to the first sound attenuating layer, and has an exterior side and an opposite interior side. The structural layer defines a plurality of passages that open to both the exterior side and the interior side so as to minimize radiation of noise due to a hydrodynamic shortcut created by each of the passages across the structural layer. The second sound attenuating layer is coupled to the structural layer and has a high sound absorption characteristic. The second sound attenuating layer is configured to be disposed adjacent to the aircraft interior.

In another aspect, the invention is an aircraft fuselage wall. A structural frame has an outer portion and an inner portion. An outer skin panel has an outer surface and an opposite inner surface affixed to the outer portion of the structural frame. A constraint damping material layer is disposed adjacent the inner surface. A thermal insulation layer is disposed adjacent to the constraint damping material layer. A plurality of anti-vibration mounts is affixed to the inward portion of the structural frame. A dual impedance insulating layer is disposed inwardly from the thermal insulation layer. A first sound attenuating layer is disposed adjacent to the dual impedance insulating layer. A structural layer is affixed to the plurality of anti-vibration mounts and is coupled to the exterior sound attenuating layer. The structural layer has an exterior side and an opposite interior side. The structural layer defines a plurality of passages that open to both the exterior side and the interior side so as to minimize radiation of noise across the structural layer. A second sound attenuating layer is coupled to the structural layer.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
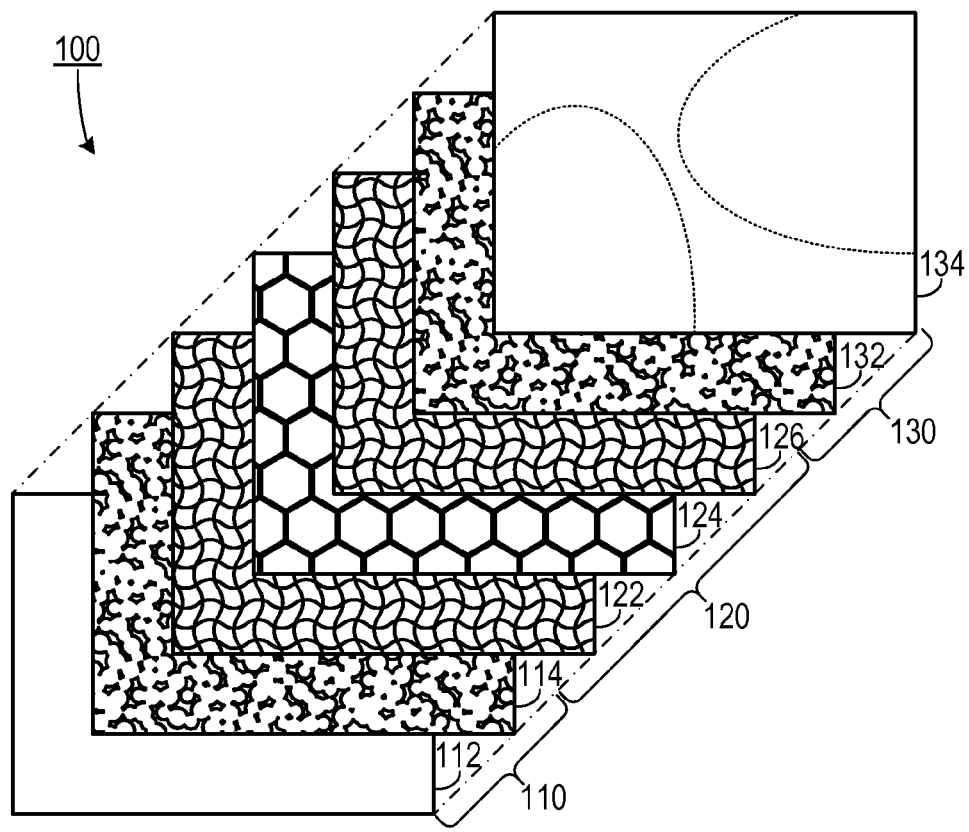
FIG. 1 is an exploded view of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

Figure 2:
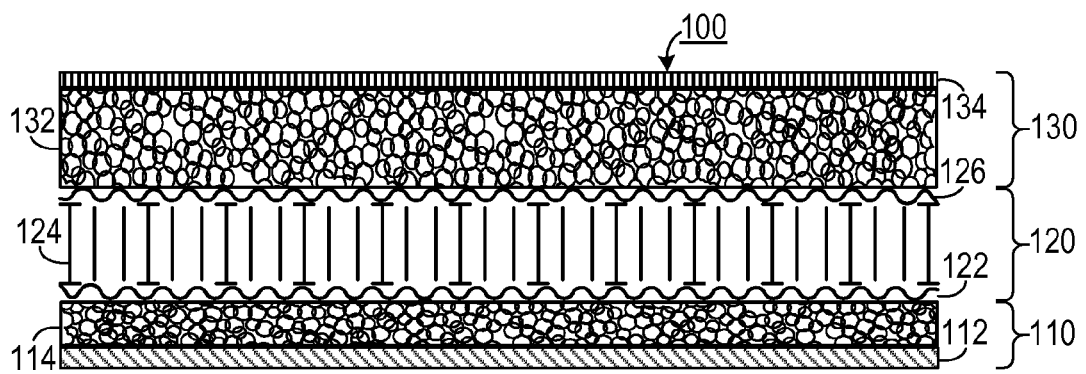
FIG. 2 is a cross-sectional view of one embodiment of the invention.

As shown in FIGS. 1 and 2, one illustrative embodiment of the invention is an aircraft trim panel 100 that includes a first sound attenuating layer 110, a structural layer 120 coupled to the exterior sound attenuating layer and a second sound attenuating layer 130 coupled to the structural layer 120.

The first sound attenuating layer 110 includes an outer layer 112 (such as a layer made from a flexible high mass material) and a sound insulating foam layer 114 (such as a layer made from an open cell foam) that is affixed to the outer layer 112. The outer layer 112 can include a thermoplastic binder highly filled with inorganic material so as to be a high density flexible sheet material (e.g. 1500-2000 kg/cubic meter). In one embodiment, the outer layer 112 includes a vinyl sheet material.

The structural layer 120 includes an outer resinated fiberglass net layer 122, a honeycomb layer 124 affixed to the outer resinated fiberglass layer 122 and an inner resinated fiberglass net layer 126 affixed to the honeycomb layer 124 opposite the outer resinated fiberglass net layer 122. The resinated glass fiber layers 122 and 126 provide lateral stiffness to the structural layer 120 and the honeycomb layer 124 provides compression stiffness to the structural layer 120.

The resinated glass fiber layers 122 and 126 are made from loosely-woven glass fiber bundles that are coated with a resin, thereby creating a rigid net. The net is highly porous, thereby allowing air to move freely therethrough. The honeycomb layer 124 may be sandwiched between the resinated glass fiber layers 122 and 126 prior to the curing of the resin so that the resinated glass fiber layers 122 and 126 are affixed to the honeycomb layer 124 once the resin has cured. This results in a rigid structural layer 120

Figure 3A:
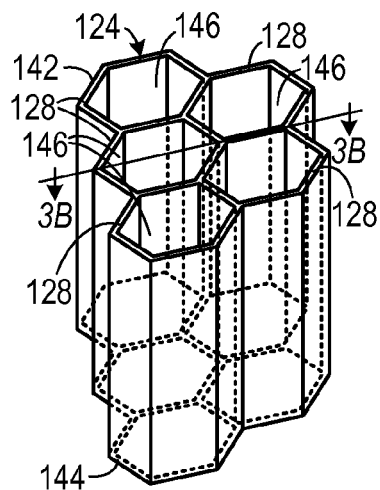
FIG. 3A is a perspective view of a section of a honeycomb portion of a structural layer.
Figure 3B:
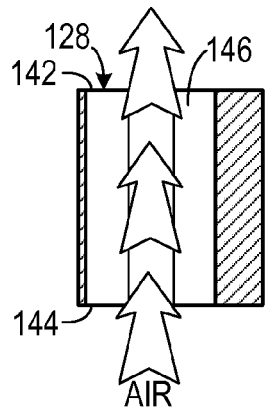
FIG. 3B is a cross-sectional view of the section shown in FIG. 3A, taken along line 3B-3B.

As shown in FIGS. 3A and 3B, the honeycomb layer 124 includes a plurality of hexagonally-shaped prismatic cells 128 that each define an elongated passage 146 opening to a first side 142 and an opposite bottom side 144. As shown in FIG. 3B, the passage 146 allows air to pass freely therethrough, thereby creating a hydrodynamic shortcut across the honeycomb layer 124. Because air can pass freely through the passages, the honeycomb layer, while rigid, does not radiate sound across the entire layer, but merely transmits local pressure fluctuations locally through the honeycomb layer 124. In one embodiment, the honeycomb layer 124 is made from a flame resistant meta-aramid material, such as a composite employing NOMEX® fiber. One method of making the honeycomb layer 124 could include forming the honeycomb so that the passages 146 are open to the top first side 142 and the bottom side 144. Another method is to use a closed cell honeycomb sheet and perforate the top first side 142 and the bottom side 144 so as to create open passages 146.

Returning to FIGS. 1 and 2, the second sound attenuating layer 130 includes a foam layer 132 (such as a layer made from open cell foam) and a porous décor material layer 134 that is affixed to the foam layer 132. In an embodiment directed to high end aircraft, the décor material layer 134 can be made from suede.

Depending on the acoustic properties desired in a given application, a desired balance between insulation and absorption can be achieved by selecting an air flow resistivity (AFR) of the décor material layer 134. If the décor material layer 134 has a high AFR, it will have a higher sound transmission loss (STL) and more low frequency absorption. However, a lower AFR will result in more high frequency absorption.

Figure 4:
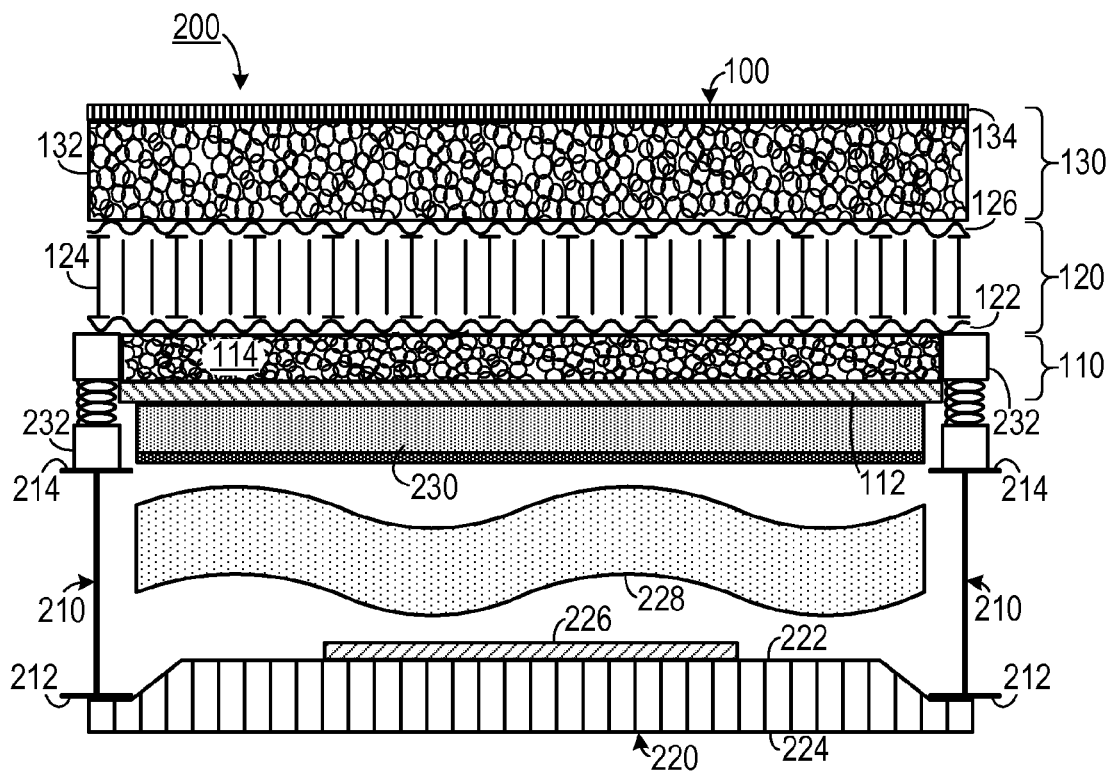
FIG. 4 is a cross-sectional view of a second embodiment of the invention.

As shown in FIG. 4, one embodiment is an aircraft fuselage wall 200 that includes a structural frame 210 that has an outer portion 212 and an inner portion 214. An outer skin panel 220, which could include a closed cell honeycomb material having an inner surface 222 and an opposite outer surface 224, is affixed to the outer portion 212 of the structural frame 210. A constraint damping material layer 226 is placed adjacent to the inner surface 222 to provide preliminary damping of noise from outside the outer skin panel 220. A floating thermal insulation layer 228 is disposed adjacent to the constraint damping material layer 226. A plurality of anti-vibration mounts 232 are affixed to the inner portion 214 of the structural frame 210. A trim panel 100, as disclosed above, is affixed to the anti-vibration mounts 232 and a dual impedance insulating layer 230 is disposed between the thermal insulation layer 228 and the trim panel 100.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A trim panel for an aircraft cabin, comprising:
   a. an exterior first sound attenuating layer, including an outer layer that includes a flexible high mass material configured to face an exterior of aircraft cabin and a foam layer affixed to an interior surface of the flexible high mass material;
   b. a rigid structural layer coupled to the first sound attenuating layer, having an exterior side and an opposite interior side, the structural layer defining a plurality of passages that each open to both the exterior side and the interior side, thereby creating a hydrodynamic shortcut therethrough that inhibits radiation of noise by the structural layer; and
   c. an interior second sound attenuating layer coupled to the structural layer, the second sound attenuating layer having a high sound absorption characteristic, the second sound attenuating layer including an air permeable foam layer affixed to the interior side of the structural layer and a porous décor material layer affixed to the foam layer and configured to face an interior of the aircraft cabin whereby air can permeate through the structural layer and the second sound attenuating layer.

2. The trim panel of claim 1, wherein the foam layer comprises an open cell foam.

3. The trim panel of claim 1, wherein the structural layer comprises:
   a. an outer resinated fiberglass net layer;
   b. a honeycomb layer affixed to the outer resinated fiberglass layer; and
   c. an inner resinated fiberglass net layer affixed to the honeycomb layer opposite the outer resinated fiberglass net layer.

4. The trim panel of claim 3, wherein the honeycomb layer comprises a flame resistant meta-aramid material formed into plurality of adjacent prismatic cells, wherein each prismatic cell defines an elongated passage therethrough and wherein each elongated passage opens to two opposite ends.

5. The trim panel of claim 4, wherein each prismatic cell has a hexagonal shape.

6. The trim panel of claim 4, wherein the flame resistant meta-aramid material comprises NOMEX®.

7. The trim panel of claim 1, wherein the décor material comprises suede.

* * * * *